UNITED STATES PATENT OFFICE.

LEANDER M. HASKINS, OF BOSTON, MASSACHUSETTS.

EDIBLE COMPOSITION.

SPECIFICATION forming part of Letters Patent No. 241,357, dated May 10, 1881.

Application filed March 7, 1881. (Specimens.)

*To all whom it may concern:*

Be it known that I, LEANDER M. HASKINS, of Boston, of the county of Suffolk and State of Massachusetts, have invented a new and useful Edible Composition; and I do hereby declare the same to be described in the following specification.

The edible composition consists of fish-bone, fish-flesh, and common salt or chloride of soda, ground together in a mill or between grinding-rolls, so as to be reduced to a powdered or comminuted state and thoroughly mixed or combined. I find that sixty pounds of the flesh, twenty pounds of the bone, and salt sufficient to give the mixture the requisite savor and preserve it from decay under ordinary circumstances, will afford in a ground state an excellent edible composition. The proportions of the ingredients of the composition may, however, be varied, as occasion may require, to produce a palatable and suitable article of food.

The said composition or new manufacture, by containing the alkaline and gelatinous properties of the bone in a powdered state, not only becomes readily digestible, and, in a sanitary point of view, better as an article of food than salted fish-flesh without any osseous additions, but can be manufactured and sold at a cheaper rate comparatively. It is well known that wheat or other flour without the admixture of the bran is not so digestible or beneficial as food as it is with a due amount of the bran, the latter containing the constituents necessary to the formation of bone. So my composition by containing osseous elements in a finely-reduced state is rendered thereby not only easier digested but better as a food, especially when suitably cooked.

I claim as a new manufacture—

The composition, substantially as described, consisting of fish-flesh, fish-bone, and salt or chloride of sodium mixed and reduced to a comminuted state, as set forth.

LEANDER M. HASKINS.

Witnesses:
R. H. EDDY,
E. B. PRATT.